P. FOTACOS.
DOWEL PIN.
APPLICATION FILED OCT. 29, 1921.

1,429,200.

Patented Sept. 12, 1922.

WITNESSES
Frederick Diehl
Hugh H. Ott

INVENTOR
PETER FOTACOS
BY
ATTORNEYS

Patented Sept. 12, 1922.

1,429,200

UNITED STATES PATENT OFFICE.

PETER FOTACOS, OF NEW YORK, N. Y.

DOWEL PIN.

Application filed October 29, 1921. Serial No. 511,386.

*To all whom it may concern:*

Be it known that I, PETER FOTACOS, a citizen of Greece, and a resident of the city of New York, borough of Manhattan, in the county and State of New York, have invented a new and Improved Dowel Pin, of which the following is a full, clear, and exact description.

This invention has relation to dowel pins and refers more particularly to an anchoring means carried by the pin for positively securing the opposite ends of the pin within the dowel openings of the members to be joined.

The invention further contemplates an anchoring means of the character described which is automatically shifted into anchoring position by the members to be secured together by the advancement of the same toward each other.

As a further object the invention aims to provide a self anchoring dowel pin which is extremely simple in its construction, inexpensive to manufacture and which is thoroughly reliable and highly efficient in accomplishment of its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variation in the phraseology of the same.

In the drawing—

Figure 1:
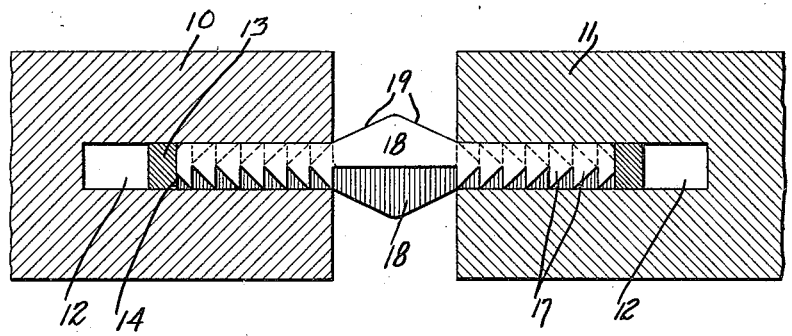
Figure 1 is a sectional view illustrating the dowel pin in partially applied position and prior to the shifting of the anchoring means to anchoring position.

Referring to the drawings by characters of reference, 10 and 11 designate a pair of members to be joined together, each of which is provided with a dowel pin receiving opening 12. The dowel pin 13 constituting the invention is longitudinally slotted at 14, said slot terminating an appropriate distance from the opposite ends of the pin. The anchoring means with which the dowel pin is equipped and which is illustrated in the preferred embodiment of the invention consists preferably of a single pair of identically formed anchoring bars 15 and 16 which are preferably constructed from steel or any other suitable metal. Each of the anchoring elements is provided at one edge with outwardly projecting sets of anchoring teeth 17 located adjacent the opposite ends thereof, the teeth of each set being pointed inwardly in opposite relation. Each element is provided at its opposite edge with a central projection 18 having oppositely inclined walls 19. The anchoring elements from their smooth edge to the line of the outer extremities of their teeth are of a width approximately equal to the diameter of the dowel pin, while the projection 18 from its highest point to a point in line with the smooth edge of the anchoring bars is of a width approximately equal to the width of the teeth. The elements are reversely arranged within the slot 14 and in normal position the anchoring teeth are disposed within the periphery of the dowel pin with the projections 18 exposed from the opposite sides thereof as illustrated in Fig. 1. In this condition the dowel pin is ready for its initial association with the members 10 and 11 which are to be joined thereby.

Figure 2:
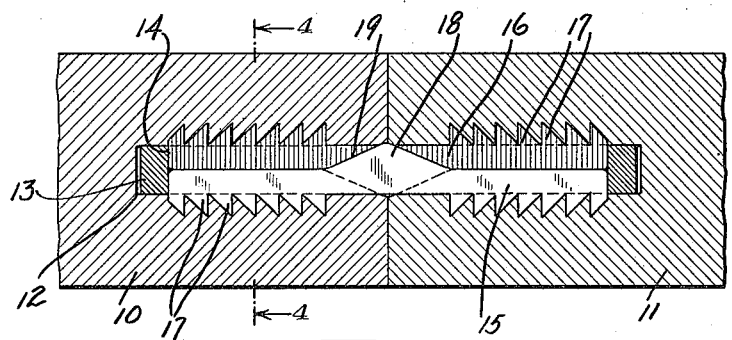
Fig. 2 is a similar view illustrating the dowel pin in fully applied position with the anchoring means shifted to anchoring position.
Figure 3:
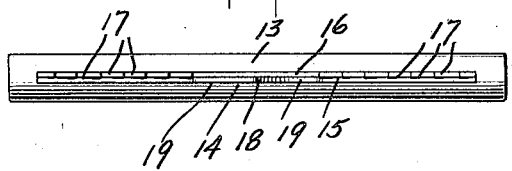
Fig. 3 is a plan view of the dowel pin removed.
Figure 4:
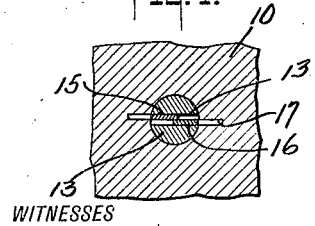
Fig. 4 is a transverse sectional view taken approximately on the line 4—4 of Fig. 2.

In use the opposite ends of the pin are inserted in the dowel receiving openings 12 of the members 10 and 11 until the confronting faces of said members are substantially in alignment with the juncture of the inclined walls of the projections with the body portions of the anchoring elements 15 and 16. The members 10 and 11 are then advanced toward each other by hammering the same together or in any other desired manner until the confronting faces thereof meet. During the advancement of the members toward each other it is obvious that the walls of the dowel pin receiving openings 12 will coact with the oppositely inclined walls 19 of the projections 18, thereby effecting a gradual radial projection of the anchoring teeth 17 through the slot 14 from the opposite sides of the dowel pin. When the confronting faces of the members 10 and 11 are finally engaged, the projections 18 will have been moved to wholly lie within the periphery of the pin, while the anchoring teeth 17 will have been wholly projected through the slot 14 and from the outer periphery of the pin to embed and engage within the diametrically opposed portions of the walls of the dowel receiving openings 12 as illustrated in Fig. 2. By forming the sets of teeth at the opposite ends of each other anchoring element to point inwardly in opposed relation, it is obvious that the members are securely coupled or attached to each other to resist relative separation thereof without the necessity of employing glue or other adhesives of this character.

Figure 5:
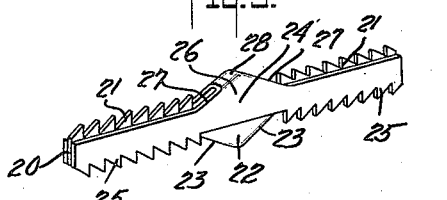
Fig. 5 is a detail perspective view of a modified form of the anchoring means.

In the modified form of the invention illustrated in Fig. 5, one of the anchoring elements 20 is constructed precisely in accordance with those of the preferred form, the same being provided at one edge with outwardly projecting sets of anchoring teeth 21 and at the other edge with a projection 22 having oppositely inclined walls 23. In this instance the other member 24 consists of parallel spaced sections each of which is constructed in accordance with the member 20 to include outwardly projecting sets of teeth 25 from one edge and a central projection 26 from its opposite edge having oppositely inclined walls 27. The sections, however, are joined together by means of a web 28 at the peak of the projection 26. In use and operation this form of anchoring means is identical with the preferred embodiment of the invention and a detailed description of the same has therefore been omitted.

I claim:

1. As a new article of manufacture, a self-anchoring dowel pin comprising a longitudinally slotted pin body and a pair of anchoring elements each having anchoring means at one edge and in actuating means disposed centrally of the opposite edge said anchoring elements reversely mounted within the slotted portion of the pin body, and normally lying within the periphery of the pin and the actuating means projecting from diametrically opposite sides of the pin whereby upon advancement toward each other of the members to be joined the said actuating means will be engaged thereby to effect movement thereof toward each other and simultaneously to effect the radial projection of the anchoring means from diametrically opposite sides of the pin body.

2. In combination, a dowel pin and anchoring means carried thereby adapted to be shifted to anchoring position upon advancement toward each other of the members to be joined by said dowel pin, comprising a longitudinally slotted portion in said dowel pin, a pair of anchoring bars arranged within said slotted portion, anchoring teeth formed on one edge of each anchoring bar, the toothed edges of said bars being disposed in diametrically opposite directions, a central projection on each anchoring bar projecting oppositely from the toothed edge thereof constituting means engageable by the walls of the dowel openings of the members to be joined for effecting the projection of the toothed edges of the anchoring members from diametrically opposite sides of the dowel pin.

3. As a new article of manufacture, a self-anchoring dowel pin comprising a longitudinally slotted pin body, a pair of anchoring bars each having teeth at one edge and a smooth opposite edge mounted within the slot with the toothed edges thereof disposed in opposite diametric relation, and a projection medially of each anchoring bar at the smooth edge thereof adapted upon advancement toward each other of the members to be joined by the dowel pin to be engaged by the walls of the dowel openings for effecting the projection of the toothed edges from diametrically opposite sides of the pin.

4. A dowel pin having a longitudinal slot therethrough, anchoring elements arranged within said slot, anchoring teeth provided on one edge of each anchoring element, a projection at the opposite edge of each anchoring element having oppositely inclined walls, said anchoring elements being reversely arranged within the slot to normally dispose the anchoring teeth within the periphery of the dowel pin and to normally dispose the projections thereof from the opposite sides of the center of the same, whereby said projections will be engaged by the members to be joined, upon advancement of said members toward each other, whereby to effect the radial projection of the anchoring teeth from the opposite sides of the pin into anchoring position.

PETER FOTACOS.